No. 762,650. PATENTED JUNE 14, 1904.
T. E. O'BRIEN.
DRILL CHUCK.
APPLICATION FILED OCT. 19, 1903.
NO MODEL.
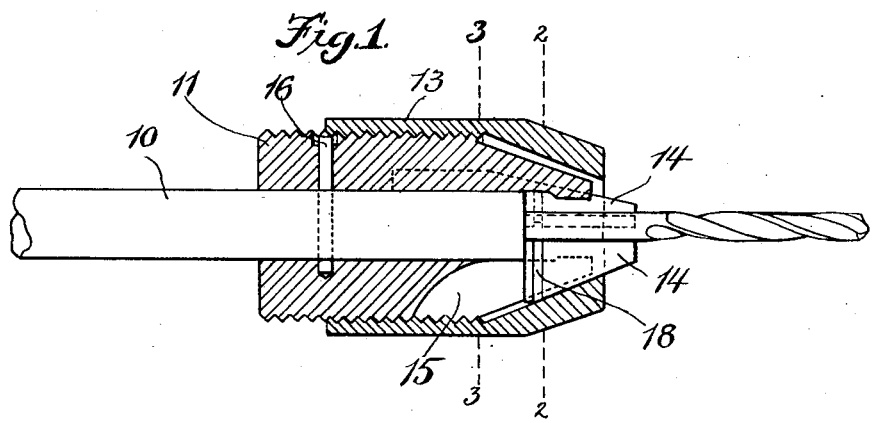
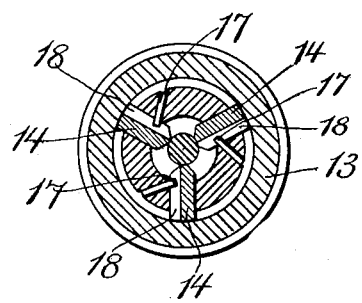
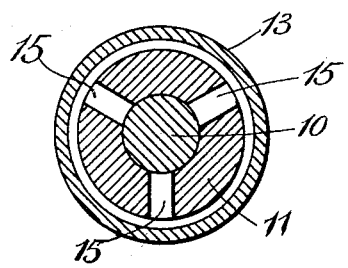
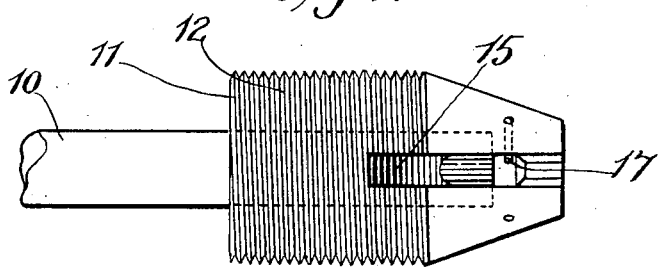
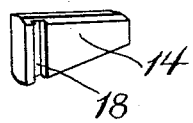
Witnesses.
P. W. Pezzetti
A. C. Ratigan
Inventor:
T. E. O'Brien,
by Wright, Brown & Quinby,
Attys.

No. 762,650.

Patented June 14, 1904.

UNITED STATES PATENT OFFICE.

THOMAS E. O'BRIEN, OF BOSTON, MASSACHUSETTS, ASSIGNOR OF THREE-EIGHTHS TO JOSEPH F. EATON, OF BOSTON, MASSACHUSETTS.

DRILL-CHUCK.

SPECIFICATION forming part of Letters Patent No. 762,650, dated June 14, 1904.

Application filed October 19, 1903. Serial No. 177,550. (No model.)

*To all whom it may concern:*

Be it known that I, THOMAS E. O'BRIEN, of Boston, in the county of Suffolk and State of Massachusetts, have invented certain new and useful Improvements in Drill-Chucks, of which the following is a specification.

This invention relates to drill-chucks; and its objects are to provide a maximum degree of simplicity consistent with durability and effective operation and to so construct the chuck that it may be made by simple and inexpensive mechanical operations and assembled with maximum ease and rapidity.

Of the accompanying drawings, Figure 1 represents an axial section of a drill-chuck embodying my invention. Fig. 2 represents a section on line 2 2 of Fig. 1. Fig. 3 represents a section on line 3 3 of Fig. 1. Fig. 4 represents a side elevation of the chuck-body. Fig. 5 represents a perspective view of one of the jaws.

The same reference characters indicate the same parts in all the figures.

In the drawings, 10 represents an arbor whose rear end is adapted to be fixed to the spindle of a lathe or to constitute the spindle of a hand-drill or other tool and whose forward portion is fixed by a pin 16 in an axial aperture in a chuck-body 11. The latter is externally threaded at 12 to receive the complementally-threaded shell 13, the latter being internally coned on its forward end and acting on the inclined backs of the radially-movable jaws 14, as is usual in drill-chucks.

15 represents jaw-guiding grooves formed in the chuck-body and extending from the periphery thereof at a point back of the forward end of the arbor 10 to said arbor, so as to expose the forward end of said arbor within the chuck-body. By thus constructing the grooves I am enabled to make them by a continuous operation, such as milling with a rotary tool, the grooves being formed in the body before the arbor 10 is inserted. The exposure of the end of the arbor enables said end to act as an abutment for the jaws to resist the backward thrust of the latter.

The jaws are retained against forward movement by pins 17, fixed in the chuck-body 11 and projecting into the jaw-guiding grooves 15 and into radial grooves 18, formed one in each jaw 14 in the side face of said jaw, the opposite side face being left plain. The jaws are removable from the chuck-body by an outward movement through the jaw-guiding grooves to release them from the pins 17, and it is evident that the chuck can be quickly assembled by reason of this construction. By constructing and mounting the pins and jaw-grooves in the manner indicated the pins are given a secure anchorage, and it is apparent that the jaw-grooves may be easily made by a saw-cut or milling-tool or otherwise.

By virtue of the described construction of the chuck it possesses a maximum degree of simplicity and may be made very cheaply.

I claim—

1. In a drill-chuck, an arbor whose forward end constitutes an abutment for the jaws, a threaded body fast on said arbor and formed with jaw-guiding grooves extending to the arbor from points on the periphery of said body back of the forward end of the arbor so as to expose said end within the chuck-body, radially-movable jaws mounted in said grooves and abutting said arbor end, and a threaded shell screwing on the body and having a wedging action on the jaws.

2. In a drill-chuck, a threaded chuck-body formed with a radial jaw-guiding groove, a jaw mounted and radially movable in said groove and formed with a groove in its side face, a pin fixed in said chuck-body and projecting into the groove in the jaw to retain the jaw against forward displacement, said pin and jaw-groove permitting removal of the jaw outwardly from the jaw-guiding groove, and a threaded shell screwing on the chuck-body for operating said jaw.

3. In a drill-chuck, a threaded chuck-body formed with a radial jaw-guiding groove, a jaw mounted and radially movable in said groove, said jaw having a plain side face and a grooved opposite side face, and on one side only of the jaw-guiding groove a pin fixed in the chuck-body and projecting into the jaw-groove.

In testimony whereof I have affixed my signature in presence of two witnesses.

THOMAS E. O'BRIEN.

Witnesses:
R. M. PIERSON,
A. C. RATIGAN.